(12) United States Patent
Suwabe et al.

(10) Patent No.: US 7,952,985 B2
(45) Date of Patent: May 31, 2011

(54) RECORDING MEDIUM, ITS MANUFACTURING METHOD, MOTHER DISC FOR RECORDING MEDIUM, AND ITS MANUFACTURING METHOD

(75) Inventors: Masatsugu Suwabe, Miyagi (JP); Fuminori Takase, Miyagi (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 12/141,549

(22) Filed: Jun. 18, 2008

(65) Prior Publication Data

US 2008/0316907 A1    Dec. 25, 2008

(30) Foreign Application Priority Data

Jun. 19, 2007 (JP) ................. 2007-161675

(51) Int. Cl.
G11B 7/24 (2006.01)
(52) U.S. Cl. .................... 369/275.4; 369/277
(58) Field of Classification Search ........... 369/275.3, 369/275.4, 277, 286, 283, 280, 288; 430/322, 430/325
See application file for complete search history.

(56) References Cited

U.S. PATENT DOCUMENTS

| 7,251,211 B2 * | 7/2007 | Endoh | 369/275.4 |
| 7,298,690 B2 * | 11/2007 | Endoh | 369/275.4 |
| 2005/0169158 A1 | 8/2005 | Abe et al. | |
| 2005/0276946 A1 | 12/2005 | Sabi et al. | |
| 2009/0129252 A1 * | 5/2009 | Endoh et al. | 369/275.4 |

FOREIGN PATENT DOCUMENTS

| EP | 1 310 953 A2 | 5/2003 |
| EP | 1 950 747 | 7/2008 |
| JP | 2003-072244 | 3/2003 |
| JP | 2005-518055 | 6/2005 |
| JP | 2008-281751 | 10/2006 |
| WO | 2007/058375 | 5/2007 |

OTHER PUBLICATIONS

Japanese Office Action dated Apr. 21, 2009, for corresponding JP Patent Application 2007-161675.
Japanese Office Action dated Aug. 11, 2009, for corresponding JP Patent Application 2007-161675.
European Search Opinion dated Oct. 7, 2009, for corresponding European Patent Application 08011081.0-1232.

* cited by examiner

*Primary Examiner* — Ali Neyzari
(74) *Attorney, Agent, or Firm* — K&L Gates LLP

(57) ABSTRACT

A recording medium is provided and includes; a substrate having a first area formed with a first groove and a second area formed with a second groove, at least one information layer provided on the substrate, and a protecting layer provided on the information layer. Predetermined binary information has previously been recorded on the first groove and the first groove is shallower or narrower than the second groove.

13 Claims, 14 Drawing Sheets

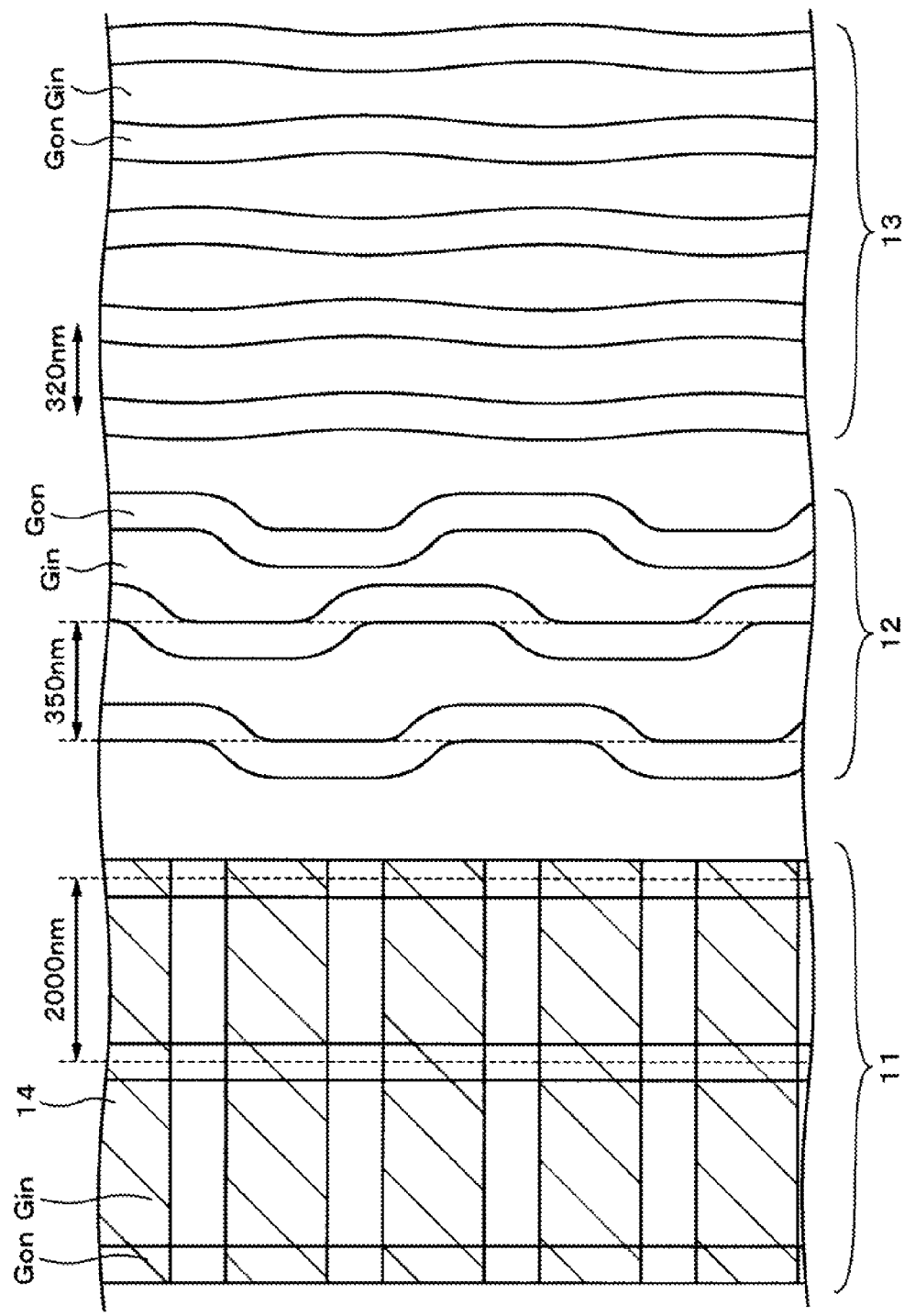

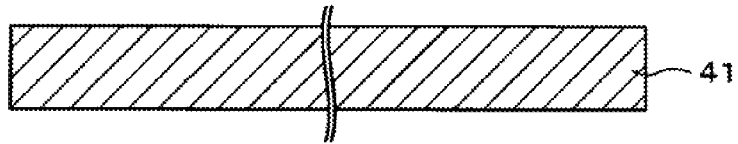
*Fig. 7A*
*Fig. 7B*
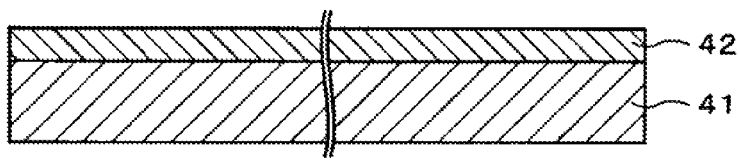
*Fig. 7C*
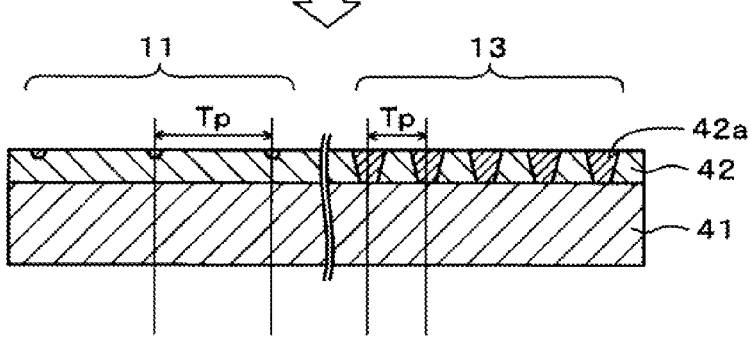
*Fig. 7D*
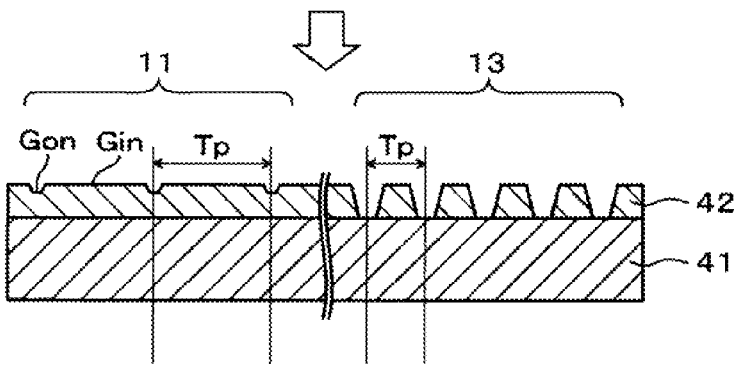

RECORDING MEDIUM, ITS MANUFACTURING METHOD, MOTHER DISC FOR RECORDING MEDIUM, AND ITS MANUFACTURING METHOD

CROSS REFERENCES TO RELATED APPLICATIONS

The present application claims priority to Japanese Patent Application JP 2007-161675 filed in the Japanese Patent Office on Jun. 19, 2007, the entire contents of which being incorporated herein by reference.

BACKGROUND

As one of copyright protecting techniques in a DVD (Digital Versatile Disc)-ROM (Read Only Memory), a recording type DVD, or the like, there is such a technique that in a state of an un-recorded disc, binary information which is called a media ID and is peculiar to the medium is recorded into an innermost rim area (Burst Cutting Area; hereinbelow, referred to as BCA) and contents data which is recorded is encrypted by using the media ID.

Also in a high density optical disc such as a BLT-ray disc (registered trademark; hereinbelow, referred to as BD) or the like, as disclosed in JP-A-2005-518055, such a technique that a bar-code-like mark (hereinbelow, referred to as a BCA mark) as binary information is recorded into the BCA has been proposed.

In JP-A-2005-518055, the following techniques have been disclosed: the BCA mark is recorded by using a crystalline state and an amorphous state of a phase change recording film; grooves or pits are formed in the BCA at a track pitch which is five or more times as large as a track pitch of adjacent areas; the BCA mark is formed in the radial direction so as to transverse a plurality of tracks; and the like. Further, the following technique has been disclosed: in the case of reproducing the BCA mark, a reproduction waveform obtained when the BCA mark is reproduced by using the grooves by tracking servo control is compared with a reproduction waveform obtained when the BCA mark is reproduced without making the tracking servo control, thereby detecting alteration of the BCA mark.

In a recording area where a signal is recorded onto an ordinary track, the signal is recorded or reproduced in a state where a spot of a laser beam has been focused onto a signal surface by focusing servo control and the track is accurately being traced by the tracking servo control. On the other hand, the BCA is an area where a consideration is taken to a technique for enabling information to be more easily read out in a state where an in-focus state according to the focusing servo control is merely obtained without making the tracking servo control.

It is assumed that the grooves (that is, tracks) have been formed also in the BCA and a signal recording layer made by an alloy, a layer separating type, or the like is also continuously formed from, for example, a lead-in area. In the BCA which is formed so as to have the signal recording layer as mentioned above, the BCA mark can be formed as follows.

For example, at a manufacturing stage, in an initial state, the signal recording layer is in an un-recorded state. For example, with respect to a data area, the recording is executed by irradiating a laser beam based on, for instance, a blue high power laser onto the whole area.

In the BCA, for example, the BCA marks are formed by irradiating the laser beam only to desired portions in the circumferential direction in correspondence to a pattern of the bar codes corresponding to the content of a disc ID. By the above step, information of a bar code form according to a pattern having bar portions in an un-recorded state of desired widths along the circumferential direction and bar portions in a recording state is recorded.

FIG. 1 shows an example of a waveform of a reproduction signal of the BCA mark of the BD (in the case where the tracking servo control is not made). In the un-recorded state, since a reflectance is high, the reproduction signal of a high level IH is obtained. In the recording state, since the reflectance is low, the reproduction signal of a low level IL is obtained.

However, in the high density optical disc such as a BD in the related art, when the tracking servo control is not made, the reproduction laser beam rides over a plurality of grooves and reads the BCA mark and the signal is modulated by diffraction due to the grooves. Therefore, as shown in FIG. 1, there is such a problem that a fluctuation in level is caused in the reproduction signal of the BCA mark due to a crosstalk of the groove signal and the signal reproduction of the BCA mark becomes unstable.

For example, in the standard of the BD, as a reference for stably reproducing the BCA mark, it has been specified that a ratio IL/IH of the low level IL to the high level IH of the signal obtained after the reproduction signal of the BCA mark passed through an LPF is equal to or less than 0.5. As shown in FIG. 1, when the level fluctuation is large, it is difficult that the ratio between a minimum value IHmin of the high level and a maximum value ILmax of the low level satisfies the value of the standard mentioned above.

It is, therefore, desirable to provide a recording medium which enables binary information which has previously been recorded in a predetermined area to be stably reproduced, a manufacturing method of such recording medium, a mother disc for the recording medium, and a manufacturing method of such a mother disc.

SUMMARY

The present disclosure relates to a recording medium, its manufacturing method, a mother disc for the recording medium, and its manufacturing method. More particularly, the present disclosure relates to a recording medium having a first area in which a first groove has been formed and a second area in which a second groove has been formed.

According to an embodiment, there is provided a recording medium comprising: a substrate having a first area in which a first groove has been formed and a second area in which a second groove has been formed; at least one information layer provided on the substrate; and a protecting layer provided on the information layer, wherein predetermined binary information has previously been recorded on the first groove, and the first groove is shallower or narrower than the second groove.

According to another embodiment, there is provided a manufacturing method of a recording medium, comprising: forming a substrate by transferring a shape of a transfer surface of a stamper to a resin material; forming an information layer onto the substrate; and forming a protecting layer onto the information layer, wherein the stamper has a first stamper groove which forms a first groove into a first area of the substrate and a second stamper groove which forms a second groove into a second area of the substrate, and the first stamper groove is shallower or narrower than the second stamper groove.

According to another embodiment, there is provided a mother disc for a recording medium, the mother disc comprising: a first area in which a first groove has been formed; and a second area in which a second groove has been formed, wherein the first groove in the first area is shallower or narrower than the second groove in the second area.

According to another embodiment, there is provided a manufacturing method of a mother disc for a recording medium, comprising: forming a resist layer onto a substrate; forming a first groove pattern by exposing the resist layer in a first area of the substrate; forming a second groove pattern by exposing the resist layer in a second area of the substrate; and developing the exposed resist layers, wherein a power of an exposing beam for forming the first groove pattern is smaller than a power of an exposing beam for forming the second groove pattern.

According to the embodiments, since the first groove formed in the first area is shallower or narrower than the second groove formed in the second area, such a phenomenon that a signal is modulated by a diffraction due to the first groove formed in the first area can be reduced. That is, a fluctuation in level which is caused in a reproduction signal of the binary information of the first area can be reduced.

As described above, according to the embodiment, since the first groove formed in the first area is shallower or narrower than the second groove formed in the second area, the diffraction due to the first groove formed in the first area can be reduced and the binary information can be preferably reproduced.

Additional features and advantages are described herein, and will be apparent from the following Detailed Description and the figures.

BRIEF DESCRIPTION OF THE FIGURES

FIG. 6 is a schematic diagram conceptually showing an example of a groove layout of the optical disc according to the first embodiment;

FIGS. 7A to 7D are cross sectional views for describing an example of a manufacturing method of the optical disc according to the first embodiment;

DETAILED DESCRIPTION

Embodiments will be described hereinbelow with reference to the drawings.

(1) First Embodiment (1-1) Construction of Optical Disc

Figure 1:
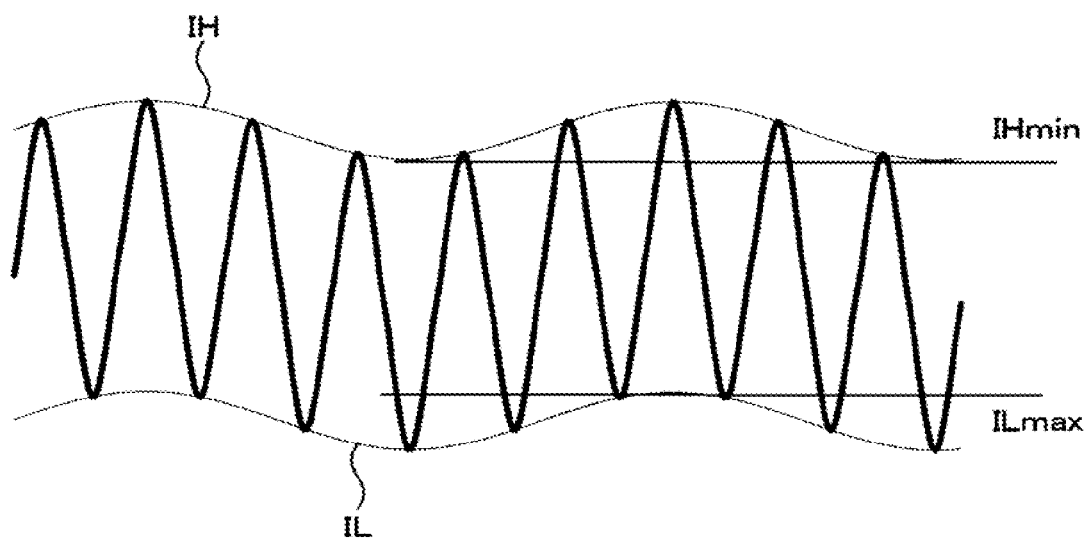
FIG. 1 is a schematic diagram showing an example of a waveform of a reproduction signal of a BCA mark of a BD.
Figure 2:
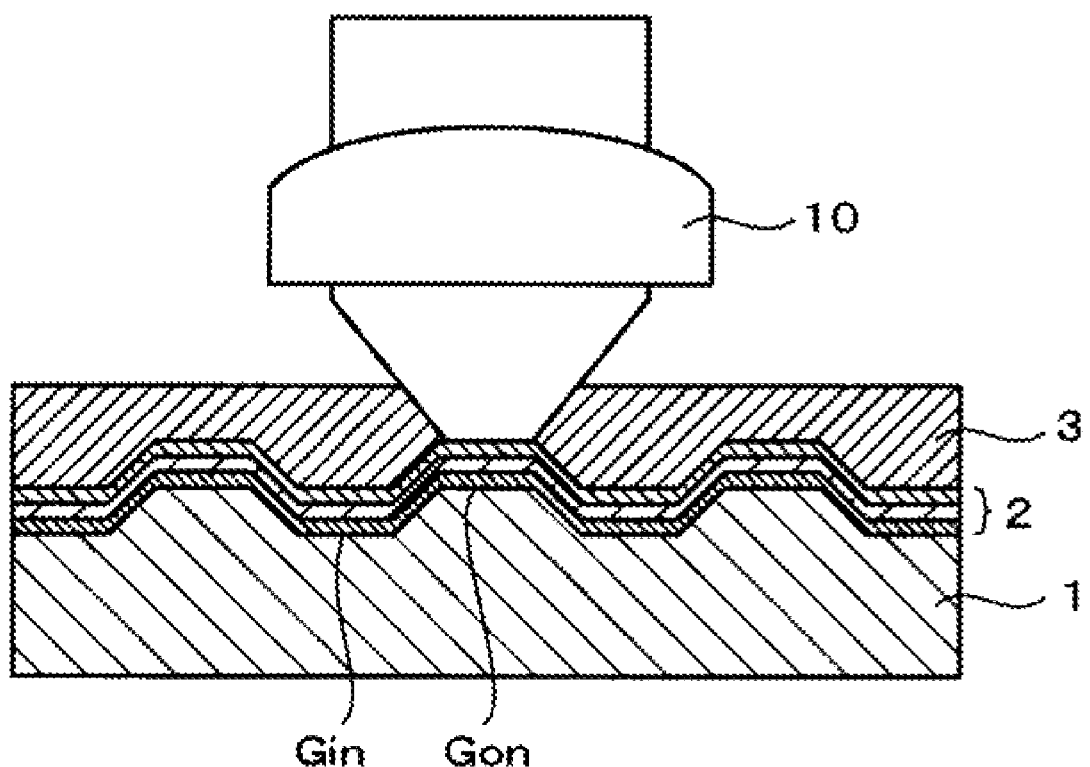
FIG. 2 is a cross sectional view showing an example of a construction of an optical disc according to the first embodiment.

FIG. 2 shows an example of a construction of an optical disc according to the first embodiment. The optical disc is, for example, a WORM (write once) type optical disc and has a construction in which an information recording layer 2 and a cover layer 3 are sequentially laminated onto a substrate 1 as shown in FIG. 2.

Figure 3:
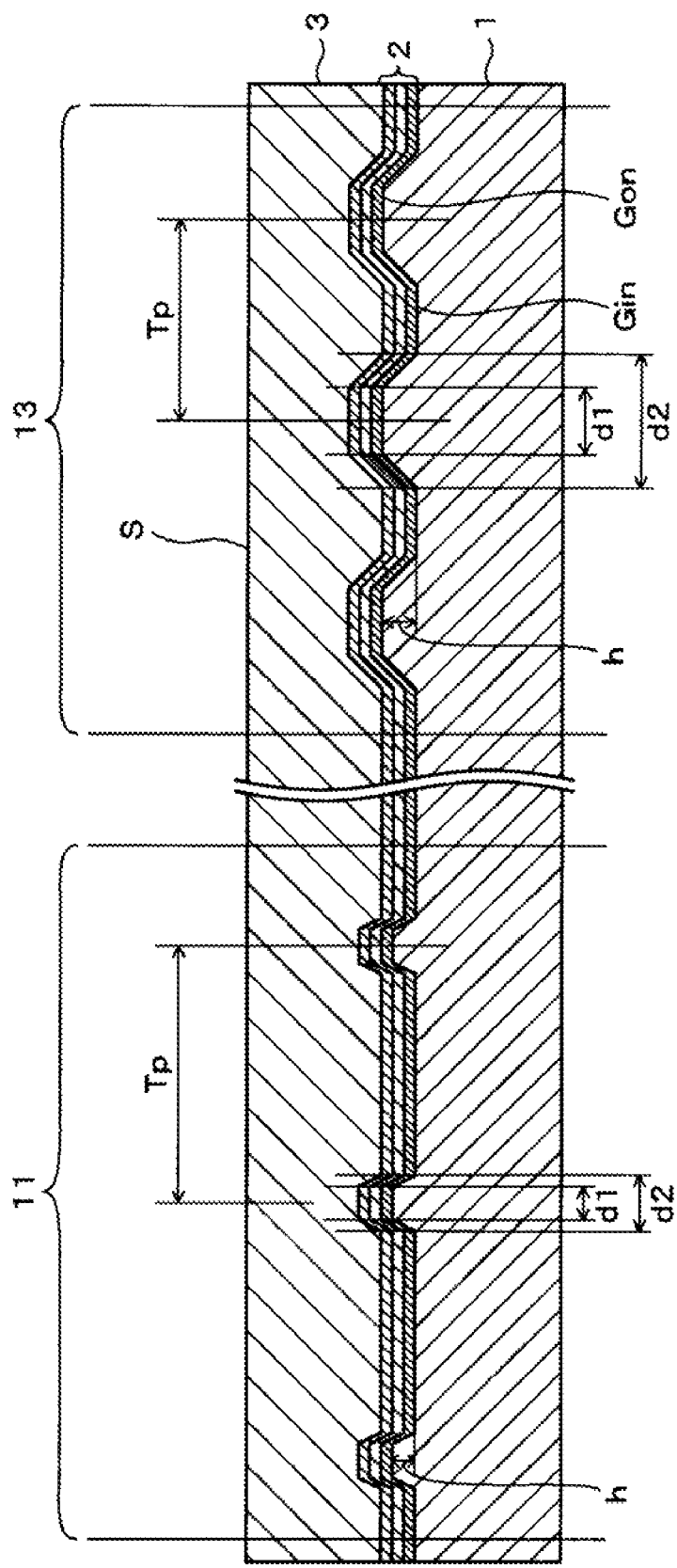
FIG. 3 is a cross sectional view showing an example of each area set to the optical disc according to the first embodiment.

FIG. 3 shows an example of areas set onto the optical disc according to the first embodiment. The optical disc has a discoidal shape with an opening at a center. As shown in FIG. 3, a BCA 11, a PIC (control data of the disc) area (not shown), and a data recording area 13 are set onto the optical disc from the inner rim side toward the outer rim side.

The recording and reproduction of an information signal are executed to the optical disc by in irradiating a laser beam from the cover layer 3 side to the information recording layer 2. For example, the laser beam having a wavelength of 400 nm to 410 nm is converged by an objective lens 10 having a numerical aperture of 0.84 to 0.86 and irradiated from the cover layer 3 side to the information recording layer 2, so that the recording or the reproduction of the information signal is executed. For example, a BD-R can be mentioned as such an optical disc.

The substrate 1, information recording layer 2, and cover layer 3 constructing the optical disc will be sequentially described hereinbelow.

(Substrate)

The substrate 1 has a ring shape formed with an opening (hereinbelow, called a center hole) at a center. One principal plane of the substrate 1 is a concave/convex surface and the information recording layer 2 is formed as a film onto the concave/convex surface. Hereinbelow, a concave portion which is far from a laser beam incident plane S in the concave/convex surface is called an in-groove Gin and a convex portion which is close to the laser beam incident plane S in the concave/convex surface is called an on-groove Gon. The convex on-groove Gon provided for the BCA 11 of the substrate 1 is an example of the first groove. The convex on-groove Gon provided for the data recording area 13 of the substrate 1 is an example of the second groove.

As shapes of the concave in-groove Gin and the convex on-groove Gon, for example, various shapes such as spiral shape, concentrical shape, and the like can be mentioned. The in-groove Gin and/or the on-groove Gon has been wobbled in order to add, for example, address information. It is desirable that the on-groove Gon in the BCA 11 has a V-character shape from a viewpoint of preferably reproducing a bar code signal.

A width d of on-groove Gon in the BCA 11 is narrower than a width d of on-groove Gon in the data recording area 13 and/or a depth (height) h of on-groove Gon in the BCA 11 is shallower (lower) than a depth (height) h of on-groove Gon in the data recording area 13. A distance between the adjacent on-grooves Gon, that is, a track pitch Tp in the BCA 11 differs from that in the data recording area 13. The track pitch Tp in the BCA 11 is wider than that in the data recording area 13. By constructing as mentioned above, such a phenomenon that a BCA signal is modulated due to a diffraction by the on-groove Gon can be reduced. That is, a fluctuation in level in the reproduction signal of the BCA mark can be reduced. In other words, a contrast IH/IL can be improved.

In the BCA 11, it is preferable that a phase depth $\lambda/\alpha n$ (where, $\lambda$: wavelength of the laser beam for recording or reproducing, $\alpha$: coefficient of a groove depth, n: refractive index of the cover layer to the laser beam for recording or reproducing) of the on-groove Gon lies within a range from $\lambda/296.8n$ to $\lambda/16.0n$, much preferably, a range from $\lambda/296.8n$ to $\lambda/63.6n$. This is because, by setting the phase depth to a value within such a range, the contrast IH/IL can be improved.

In the BCA 11, it is preferable that the depth h of the on-groove Gon lies within a range from 0.9 nm to 16.7 nm, much preferably, a range from 0.9 nm to 4.2 nm. This is because, by setting the depth to a value within such a range, the contrast IH/IL can be improved.

In the BCA 11, it is preferable that the width d of the on-groove Gon lies within a range from 55 nm to 126 nm, much preferably, a range from 55 nm to 95 nm. This is because, by setting the width to a value within such a range, the contrast IH/IL can be improved.

In the BCA 11, it is preferable that a ratio (d/Tp) of the width d of the on-groove Gon to the track pitch Tp lies within a range from 0.0275 to 0.063, much preferably, a range from 0.0275 to 0.0475. This is because, by setting the ratio to a value within such a range, the contrast IH/IL can be improved. The width d of on-groove Gon is equal to an average value (d1max+d2min)/2 of a maximum width d1max of a width d1 of on-groove Gon on the side of the laser beam incident plane S and a minimum width d2min of a width d2 of on-groove Gon on the side of a bottom portion opposite to the incident plane S side.

A diameter of the substrate 1 is selected to, for example, 120 mm, A thickness of the substrate 1 is selected to, preferably, a value within a range from 0.3 mm or more to 1.3 mm or less, much preferably, a range from 0.6 mm or more to 1.3 mm or less in consideration of rigidity. The thickness of the substrate 1 is set to, for example, 1.1 mm. A diameter of the center hole is selected to, for example, 15 mm.

For example, although a resin material such as polycarbonate system resin, polyolefine system resin, acrylic resin, or the like or glass can be used as a material of the substrate 1, it is preferable to use the resin material in consideration of a point of costs or the like. Specifically speaking, for example, ZEONEX or polycarbonate (PC) (refractive index: 1.59) can be used as a resin material.

As a forming method of the substrate 1, a method by which a desired shape and smoothness of the substrate surface which is optically sufficient can be obtained may be used and it is not particularly limited. For example, an injection molding method (injection method) or a photopolymer method (2P method: Photo Polymerization) using an ultraviolet hardening resin can be used. According to the injection molding method, a formed mother stamper is arranged in a die cavity for manufacturing a disc substrate, a transparent resin such as polycarbonate or the like is injected, and a concave/convex shape of the mother stamper is transferred onto the resin, thereby manufacturing the substrate 1.

(Information Recording Layer)

The information recording layer 2 has at least, for example, an inorganic recording film. The inorganic recording film is, for example, a WORM type inorganic recording film. As such a type of inorganic recording film, for example, a phase change type, an alloy type, or the like can be mentioned.

As an inorganic recording film of the phase change type, for example, a recording film made of tellurium Te, palladium Pd, and oxygen O can be used. As an inorganic recording film of the alloy type, for example, a recording film made by laminating a silicon Si film and a copper Cu alloy film can be used.

Figure 4:
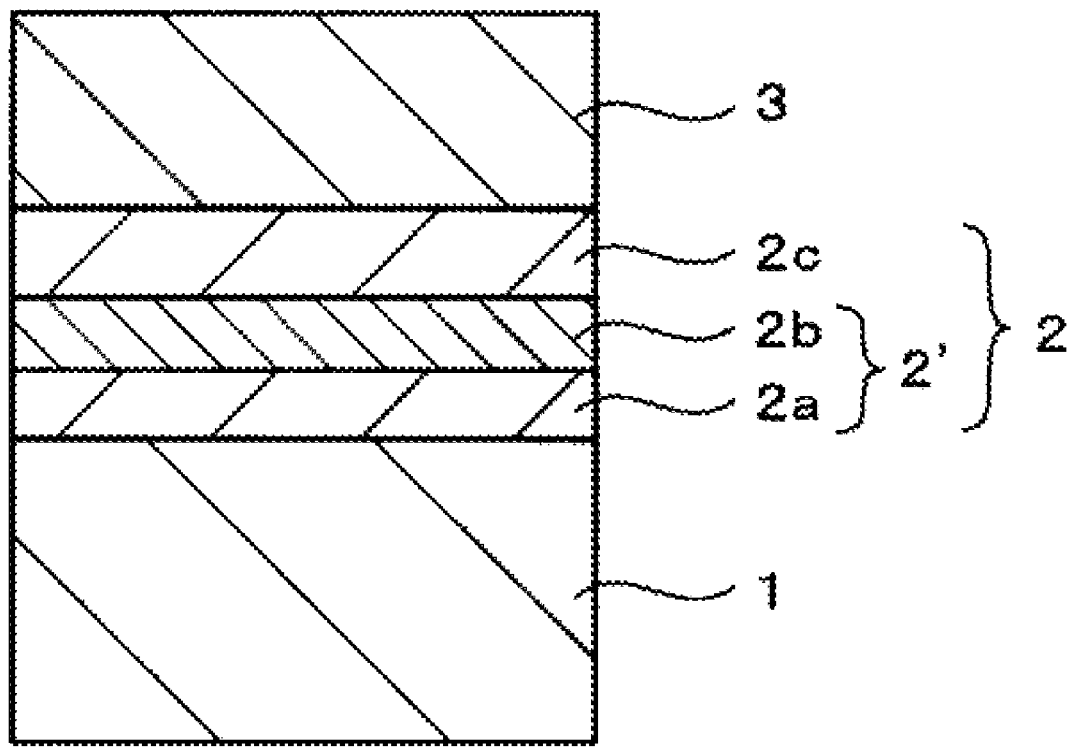
FIG. 4 is a cross sectional view showing a first example of an information recording layer of the optical disc according to the first embodiment.

FIG. 4 shows a first example of the information recording layer 2. The information recording layer 2 is formed by sequentially laminating an inorganic recording film 2' and a dielectric film 2c onto the substrate 1. The inorganic recording film 2' contains a first recording film 2a and a second recording film 2b sequentially laminated on the concave/convex surface of the substrate 1. The first recording film 2a is provided on the side of the concave/convex surfaces of the substrate 1. The second recording film 2b is provided on the side of the dielectric film 2c.

The first recording film 2a contains, for example, titanium Ti as a main component. It is preferable that the first recording film 2a contains metal of a low thermal conductivity such as manganese Mn, zirconium Zr, hafnium Hf, or the like as an additive from a viewpoint of improvement of a power margin. A content of the metal of the low thermal conductivity is equal to, preferably, 1 to 40 atom %, much preferably, 2 to 30 atom %, and further preferably, 5 to 28 atom % from a viewpoint of improvement of the power margin. It is also preferable that the first recording film 2a contains nitrogen N of a small amount from a viewpoint of adjustment of recording sensitivity. A film thickness of first recording film 2a is preferably equal to 10 to 50 nm.

The second recording film 2b contains, for example, an oxide of germanium Ge as a main component. It is preferable that a content of the oxide of germanium Ge in the second recording film 2b is equal to 88 to 97 atom %, much preferably, 90 to 97 atom %, and further preferably, 90 to 95 atom %. It is also preferable that the second recording film 2b contains tin Sn as an additive from a viewpoint of improvement of durability. It is preferable that a content of tin Sn in the second recording film 2b is equal to 3 to 12 atom %, much preferably, 3 to 10 atom %, and further preferably, 5 to 10 atom %. This is because if the content of tin Sn is equal to or larger than 3 atom %, the excellent durability can be obtained and if it is equal to or less than 12 atom %, excellent signal characteristics can be obtained. If the first recording film 2a contains titanium Ti as a main component and the second recording film 2b contains the oxide of germanium Ge as a main component, the good recording characteristics can be fundamentally obtained.

It is preferable that a coefficient of absorption k of the second recording film 2b lies within a range from 0.15 or more to 0.90 or less, much preferably, a range from 0.20 or more to 0.70 or less, and further preferably, a range from 0.25 or more to 0.60 or less from a viewpoint of improvement of a modulation degree and a carrier-to-noise ratio (hereinbelow, referred to as a C/N ratio), or the like. A film thickness of the second recording film 2b is equal to, preferably, 10 to 35 nm.

The absorption coefficient k in the specification is measured at a wavelength of 410 nm. The absorption coefficient k can be obtained as follows by using an ellipsometer (made by Rudolph Co., Ltd.; trademark: Auto EL-462P17). A tangent $\psi$ which is obtained from a phase angle $\Delta$ of an elliptic polarization light and an amplitude intensity ratio of an ellipse is measured by the ellipsometer. A complex refractive index N and the absorption coefficient k are obtained from the film thickness obtained by a surface profiler (made by Tencor Co., Ltd.; trademark: P15). The above operations are executed by using a method of least squares or the like in commercially available attached analysis software of the ellipsometer.

The dielectric film $2c$ is provided adjacent to the inorganic recording film $2'$ and is used to optically and mechanically protect the inorganic recording film $2'$, that is, improve the durability, and suppress a deformation, that is, swelling of the inorganic recording film $2'$ in the recording mode, and the like. As a material of the dielectric film $2c$, for example, SiN, $ZnS$—$SiO_2$, AlN, $Al_2O_3$, $SiO_2$, $SiO_2$—$Cr_2O_3$—$ZrO_2$ (hereinbelow, referred to as SCZ), or the like can be used. It is preferable to use $ZnS$—$SiO_2$. This is because an s/N ratio of the recording signal is improved and excellent signal characteristics can be obtained. A thickness of dielectric film $2c$ is preferably equal to 10 to 100 nm.

Figure 5:
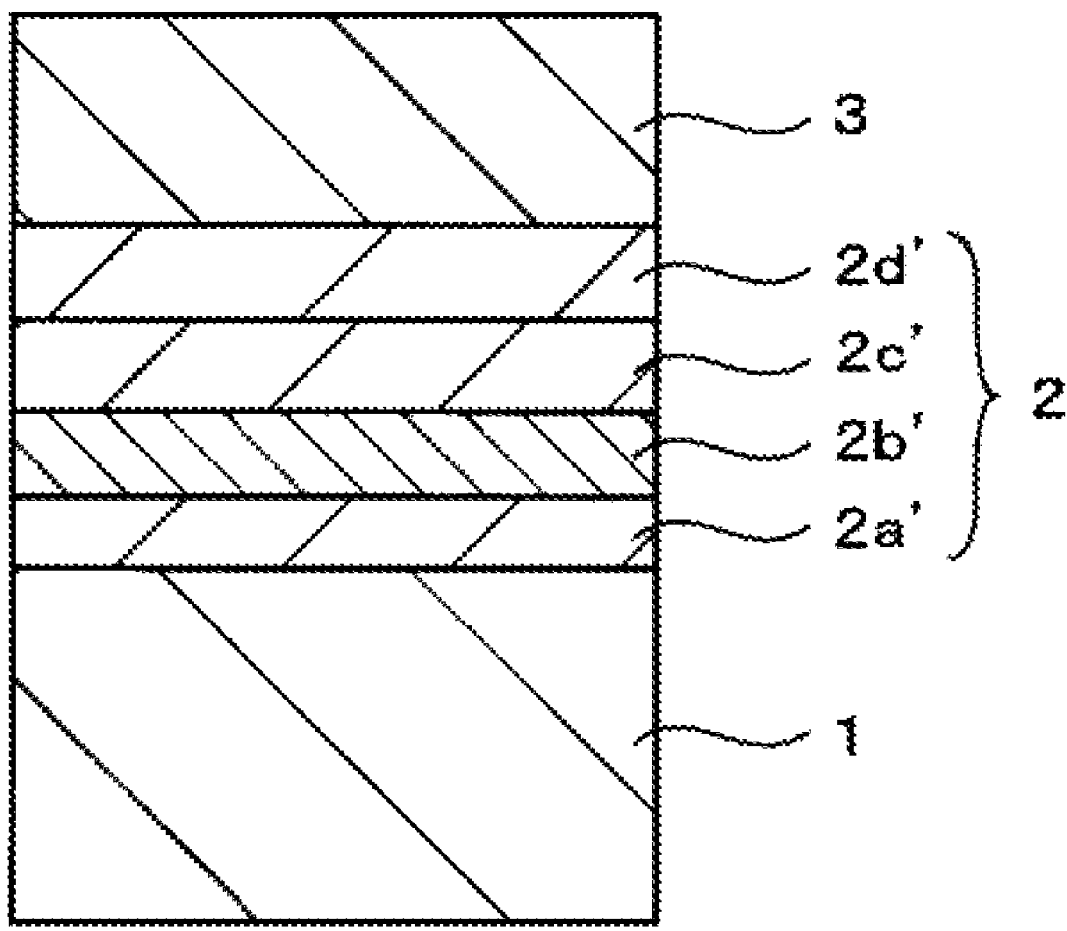
FIG. 5 is a cross sectional view showing a second example of the information recording layer of the optical disc according to the first embodiment.

FIG. 5 shows a second example of the information recording layer 2. The information recording layer 2 is formed by sequentially laminating a reflecting film $2a'$, a dielectric film $2b'$, an inorganic recording film $2c'$, and a dielectric film $2d'$ onto the substrate.

As a material forming the dielectric films $2b'$ and $2d'$, for example, SiN, $ZnS$—$SiO_2$, AlN, $Al_2O_3$, $SiO_2$, SCZ, or the like can be used. It is preferable to use $ZnS$—$SiO_2$.

The inorganic recording film $2c'$ contains, for example, Sb—Zn—S—$SiO_2$ as main components. As a material forming the reflecting film $2a'$, for example, a simple substance such as Al, Ag, Au, Ni, Cr, Ti, Pd, Co, Si, Ta, W, Mo, Ge, or the like or an alloy containing them as main components can be used. Among them, particularly, the material of the Al system, Ag system, Au system, Si system, and Ge system are preferable in terms of practicality. As an alloy, for example, Al—Ti, Al—Cr, Al—Cu, Al—Mg—Si, Ag—Pd—Cu, Ag—Pd—Ti, Si—B, or the like is preferably used. It is preferable to set ones of those materials in consideration of optical characteristics and thermal characteristics. For instance, it is preferable to use the material of the Al system or the Ag system in consideration of a point that it has a high reflectance even in a region of a short wavelength.

(Cover Layer)

The cover layer 3 is provided on the information recording layer 2. The cover layer 3 is formed for protection of the information recording layer 2 or the like. The recording and reproduction of the information signal are executed by, for example, converging the laser beam onto the information recording layer 2 through the cover layer 3. The cover layer 3 is a cover layer 3 of, for example, a resin coating type or a sheet adhering type. The cover layer 3 of the resin coating type indicates the cover layer 3 formed by a resin coating method. The cover layer 3 of the sheet adhering type indicates the cover layer 3 formed by a sheet adhering method. The resin coating method and the sheet adhering method will be described hereinafter.

A thickness of cover layer 3 is selected preferably from a range of 10 to 177 μm and is set to, for example, 100 μm. The high density recording can be realized by combining such a thin cover layer 3 and the objective lens having a high NA (numerical aperture) of, for example, about 0.85. A bore (diameter) of the cover layer 3 is set to, for example, 22.7 mm.

The cover layer 3 of the resin coating type is a resin cover formed by hardening a photosensitive resin such as a UV resin or the like. The cover layer 3 of the sheet adhering type is formed by, for example, a light transmitting sheet (film) having a ring shape and an adhesive layer for adhering the light transmitting sheet to the substrate 1. The adhesive layer is made of, for example, a UV resin or a pressure sensitive adhesive (hereinbelow, referred to as PSA). It is preferable that a thickness of light transmitting sheet is equal to 0.3 mm or less, and much preferably, 3 to 177 μm, for example, 80 μm. A thickness of adhesive layer is equal to, for example, 20 μm.

It is preferable that the light transmitting sheet and the resin cover are made of a material of low absorbing performance for the laser beam which is used for recording and reproduction. Specifically speaking, it is preferable that they are made of a material whose transmittance is equal to or larger than 90%. As a material of the light transmitting sheet, for example, a polycarbonate system resin, a polyolefine system resin (for example, ZEONEX®) or the like can be mentioned. As a material of the resin cover, for example, an acrylic resin of an ultraviolet hardening type can be mentioned.

(Each Area of Optical Disc)

The BCA 11, PIC area 12, and data recording area 13 provided on the optical disc according to the first embodiment will be described hereinbelow.

FIG. 6 conceptually shows an example of a groove layout of the information recording layer 2 on the optical disc according to the first embodiment. A case where the on-groove Gon becomes a track for recording data will be described here as an example. In FIG. 6, it is assumed for simplicity of drawing that a width of on-groove Gon provided in each of the BCA 11 and the PIC area 12 is almost equal to a width of on-groove Gon provided in the data recording area 13. However, as mentioned above, the width d of on-groove Gon provided in the BCA 11 may be set to be narrower than the width d of on-groove Gon provided in each of the PIC area 12 and the data recording area 13.

A layout of the grooves of a track pitch of 2000 nm is formed in the BCA 11 on the innermost rim side. A layout of the wobble grooves of a track pitch of 350 nm is formed in the PIC area 12 on the outside of the BCA 11. Further, the wobble grooves of a track pitch of 320 nm are formed in the data recording area 13 on the outside of the PIC area 12. The grooves formed in each of those areas are formed on the substrate surface so as to be in one spiral line. A track pitch transition area (not shown) for switching the track pitch is arranged between the are where the track pitch changes.

The BCA 11 is provided in a range of a radius r (=21.3 mm to 22.0 mm). The groove-shaped tracks are formed in the BCA 11. The track pitch is equal to 2000 nm and shows a sufficiently wide interval. A BCA mark 14 is recorded in the BCA 11. The BCA mark 14 is bar code data of binary information indicative of a serial number, a lot number, or the like. As information peculiar to the optical disc, the BCA mark 14 is used for copyright protection. The BCA mark 14 is formed in such a manner that a plurality of belt-shaped marks each of which is extended in the radial direction so as to transverse a plurality of grooves in the BCA 11 are formed, for example, on one circumference of the disc.

The BCA marks 14 are recorded after the optical disc was manufactured. In the initial state of the optical disc, the information recording layer is in the un-recorded state. The information recording layer is set into a recording state by irradiating the laser beam only to desired portions (hatched regions in FIG. 6) in correspondence to the BCA marks 14. As a result of this step, in the BCA 11 of the information recording layer 2, information of a bar code form according to a pattern having bar portions in the recording state of desired widths along the circumferential direction and bar portions in the un-recorded state is recorded.

The PIC area 12 is a read only area and is provided in a range of the radius r (=22.4 mm to 23.197 mm). Groove tracks including a layout of rectangular wobble grooves are formed in the PIC area 12 at a track pitch of 350 nm. The information is reproduced from the layout of the rectangular wobble grooves.

The data recording area 13 is provided in a range of the radius r (=23.2 mm to 58.5 mm). Sinusoidal wobble grooves are formed in the data recording area 13. A track pitch is equal to 320 nm. This is because it is intended to obtain a large capacity which enables the recording and reproduction of a further long time by narrowing the track pitch. Data is actually recorded to a region on the outer peripheral side of the radius r (=24.0 mm).

A control signal is used in each area in order to form the grooves adapted to each area. In the case of forming the DC grooves in the BCA 11, the control signal is a direct current (DC) signal. In the case of forming the rectangular wobble grooves in the PIC area 12, the control signal is a rectangular signal of a biphase modulation. In the case of forming the wobble grooves in the data recording area 13, a multiplex signal of an MSK (Minimum Shift Keying) of 956 [kHz] and an STW (Saw Tooth Wobble) of a double wave is used. The multiplex signal of the MSK and STW records wobble information of the address.

The reason why the multiplex wobble of the MSK and STW is used is as follows. In the case of the MSK system, although an excellent S/N ratio (Signal To Noise Ratio) is obtained, there is such a problem that when there is a wobble shift, it is difficult to detect the address. In the case of the STW, it is strong against the wobble shift and the address can be detected without a substantial deterioration. Therefore, by combining them, the address can be certainly detected.

In the rewriting type BD-RE (Blu-ray Disc ReWritable) disc, one bit of "0" or "1" is expressed by 56 wobbles in total. Those 56 wobbles are set to a unit and called an ADIP (Address in pregroove) unit. An ADIP word showing one address is formed by continuously reading out 83 ADIP units. The ADIP word includes the address information having a length of 24 bits, auxiliary data having a length of 12 bits, a reference (calibration) area, error correction data, and the like. In the BD-RE, three ADIP words are allocated per RUB (Recording unit block; a unit of 64 kbytes) for recording main data.

(1-2) Manufacturing Method of Optical Disc

Subsequently, an example of a manufacturing method of the optical disc having such a construction as mentioned above will be described with reference to FIGS. 7A to 8E.
(Manufacturing Steps of Mother Disc for Optical Disc)

First, as shown in FIG. 7A, a disc-shaped (discoidal) substrate 41 is prepared. The substrate 41 is, for example, a quartz substrate, an Si substrate, or the like. Subsequently, as shown in FIG. 7B, a resist layer 42 is formed on the surface of the substrate 41. The resist layer 42 is made of an organic system resist or an inorganic resist. As an organic system resist, for example, a novolak system resist, a chemical amplifying type resist, or the like can be used. As an inorganic resist, for example, an imperfect oxide of a transition metal can be used. As such a transition metal, for example, Ti, V, Cr, Mn, Fe, Nb, Cu, Ni, Co, Mo, Ta, W, Zr, Ru, Ag, or the like can be used. Among them, it is preferable to use Mo, W, Cr, Fe, or Nb. It is preferable to use Mo or W from a viewpoint that a large chemical change can be obtained due to visible light or ultraviolet rays. Not only one kind of those transition metals but also two or more kinds of them can be also used.

Subsequently, the substrate 41 is put onto a turntable of a cutting apparatus (not shown) and while the substrate 41 is rotated, an exposing beam is moved from the center of the substrate 41 toward the outer circumference side. Thus, as shown in FIG. 7C, a latent image 42a according to an irradiation locus of the exposing beam is formed over the whole surface of the resist layer 42.

It is preferable to set a cutting power in the BCA 11 to be smaller than that in the data recording area 13 from a viewpoint of the characteristics of the bar code signal. Specifically speaking, it is preferable that the cutting power in the BCA 11 lies within a range from 150% to 100%, much preferably, a range from 100% to 120%.

Subsequently, the substrate 41 is set onto a turntable of a developing apparatus (not shown) and the substrate 41 is rotated for a horizontal surface. A developing liquid is dropped onto the resist layer 42 and the resist layer 42 is developed. Thus, as shown in FIG. 7D, the resist in an exposed portion or an un-exposed portion in the resist layer 42 is removed. That is, a predetermined resist pattern is formed. An example in which the resist in the exposed portion is removed is shown in FIG. 7D.

The target mother disc for the optical disc is obtained in this manner.
(Manufacturing Steps of Stamper)

Subsequently, a conductive film such as a nickel coating film or the like is formed onto the concave/convex pattern of the obtained mother disc for the optical disc by, for example, an electroless plating method. Thereafter, the optical disc mother disc formed with the conductive film is attached to an electroforming apparatus and plating is performed by an electric plating method so as to obtain a layer having a thickness of about, for example, 300±5 [µm] on the conductive film, thereby forming a plated layer having the concave/convex pattern. As a material forming the plated layer, for example, a metal such as nickel or the like can be used.

Subsequently, the plated layer is peeled off from the mother disc for the optical disc by, for example, a cutter or the like. Thereafter, by performing trimming to the plated layer, the plated layer is set into a predetermined size and the resist adhered onto the signal forming surface of the plated layer is cleaned by using, for example, an acetone or the like.

Figure 8A:
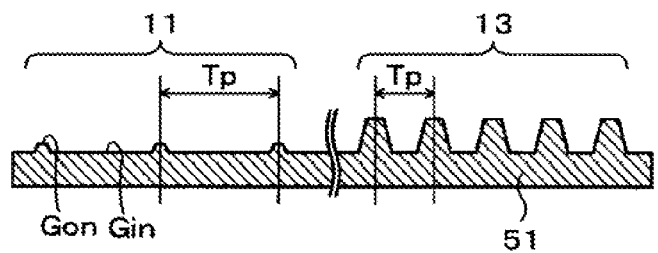
FIGS. 8A to 8E are cross sectional views for describing an example of the manufacturing method of the optical disc according to the first embodiment.

A target master stamper 51 shown in FIG. 8A is obtained in this manner.

The master stamper 51 has a ring shape formed with an opening at a center and grooves have been formed on one principal plane. Each of the grooves, that is, concave portions formed on the master stamper 51 is called an in-groove Gin and a convex portion formed between the in-grooves Gin is called an on-groove Gon hereinbelow. The in-groove Gin and the on-groove Gon have the same shapes as those of the in-groove Gin and the on-groove Gon of the substrate 1.

The BCA 11, the PIC area (not shown), and the data recording area 13 are sequentially provided on one principal plane of the master stamper 51 from the center portion toward the outer peripheral side in a manner similar to the foregoing substrate 1. The width d of on-groove Gon in the BCA 11 is narrower than width d of on-groove Gon in the data recording area 13 and/or the depth h of on-groove Gon in the BCA 11 is shallower than the depth h of on-groove Gon in the data recording area 13. A distance between the adjacent on-grooves Gon, that is, the track pitch Tp in the BCA 11 differs from that in the data recording area 13. The track pitch Tp in the BCA 11 is wider than that in the data recording area 13.

Figure 8B:
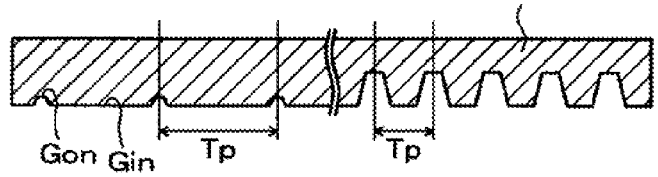
Figure 8C:
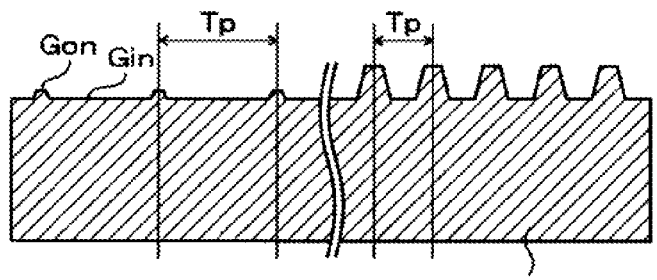

Subsequently, a mother stamper 52 as a reverse stamper of the master stamper 51 is formed from the master stamper 51 by, for example, an MMS (master mother stamper) transfer technique. As shown in FIG. 8B, the on-grooves Gon and in-grooves Gin having the reversed shapes of the shapes of the on-grooves Gon and in-grooves Gin of the master stamper 51 are formed on one principal plane of the mother stamper 52.
(Manufacturing Steps of Optical Disc)

Subsequently, for example, the substrate 1 as shown in FIGS. 8A to 8E is molded from the mother stamper 52 by, for example, the injection molding method (injection method) or the photopolymer method (2P method: Photo Polymerization) or the like.

Figure 8D:
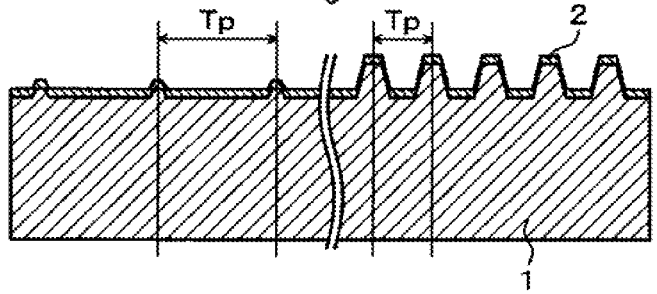

Subsequently, the first recording film 2a, second recording film 2b, and dielectric film 2c are sequentially laminated onto the substrate 1 by, for example, a sputtering method, or the reflecting film 2a', dielectric film 2b', inorganic recording film 2c', and dielectric film 2d' are sequentially laminated onto the substrate 1. Thus, the information recording layer 2 is formed onto the substrate 1 as shown in FIG. 8D.

Figure 8E:
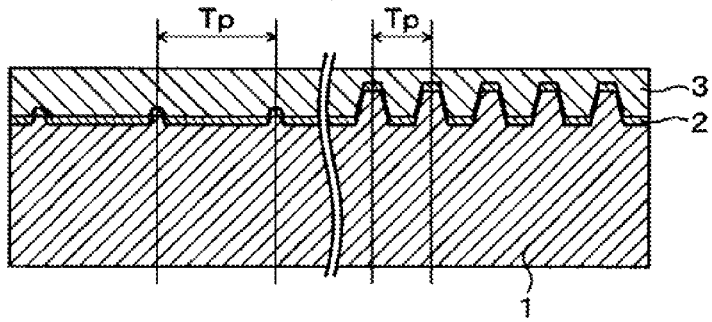

Subsequently, as shown in FIG. 8E, the cover layer 3 is formed onto the information recording layer 2. As a forming method of the cover layer 3, for example, the resin coating method, the sheet adhering method, or the like can be used. The resin coating method is preferable from a viewpoint of reduction of the costs. According to the resin coating method, the surface of the information recording layer 2 is spin-coated with a photosensitive resin such as a UV resin or the like and light such as UV light or the like is irradiated onto the photosensitive resin, thereby forming the cover layer 3 as a resin cover. According to the sheet adhering method, a light transmitting sheet is adhered onto the concave/convex surface side on the substrate 1 by using an adhesive, thereby forming the cover layer 3.

As a sheet adhering method, for example, a sheet resin adhering method, a sheet PSA adhering method, or the like can be used. According to the sheet resin adhering method, the light transmitting sheet is adhered onto the concave/convex surface side on the substrate 1 by using the photosensitive resin such as a UV resin or the like coated on the information recording layer 2, thereby forming the cover layer 3. According to the sheet PSA adhering method, the light transmitting sheet is adhered onto the concave/convex surface side on the substrate 1 by using the pressure sensitive adhesive (PSA) which has previously and uniformly been coated onto one principal plane of the sheet, thereby forming the cover layer 3.

Subsequently, for example, a bar-code-like recording mark is formed in the BCA 11. As a forming method of the recording mark, the following method can be mentioned: a method whereby a laser beam modulated in a pulse shape is irradiated from the cover layer 3 side, thereby changing physical properties of the information recording layer 2 (recording method similar to that of the data recording area 13); or a method whereby the laser beam modulated in a pulse shape is irradiated from the substrate 1 side, thereby melting and removing the information recording layer 2.

The target optical disc is obtained in this manner.

(2) Second Embodiment (2-1) Construction of Optical Disc

Figure 9:
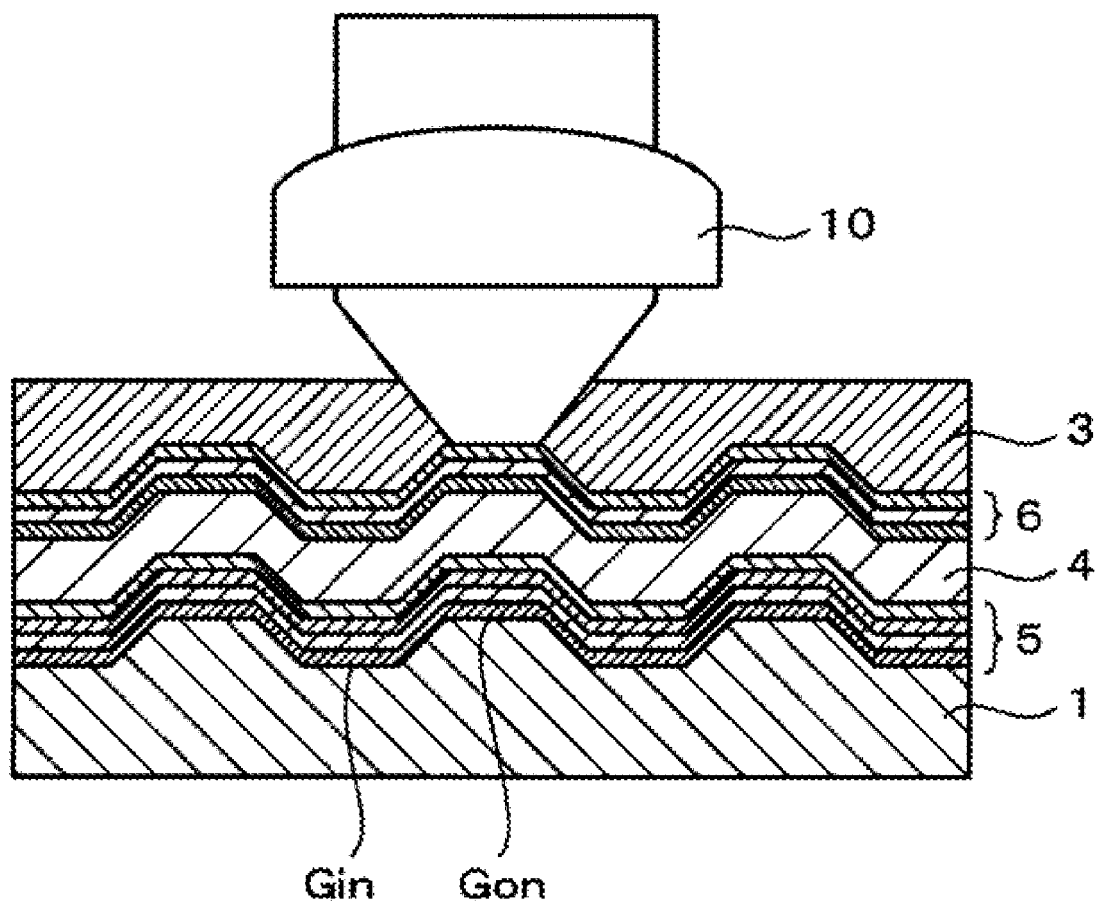
FIG. 9 is a cross sectional view showing an example of a construction of an optical disc according to the second embodiment.

FIG. 9 shows an example of a construction of an optical disc according to the second embodiment. The optical disc is, for example, a WORM type optical disc and has such a construction that a first information recording layer 5, an intermediate layer 4, a second information recording layer 6, and the cover layer 3 are sequentially laminated onto the substrate 1 as shown in FIG. 9. The portions similar to those in the foregoing first embodiment are designated by the same reference numerals and their explanation is omitted here.

Figure 10:
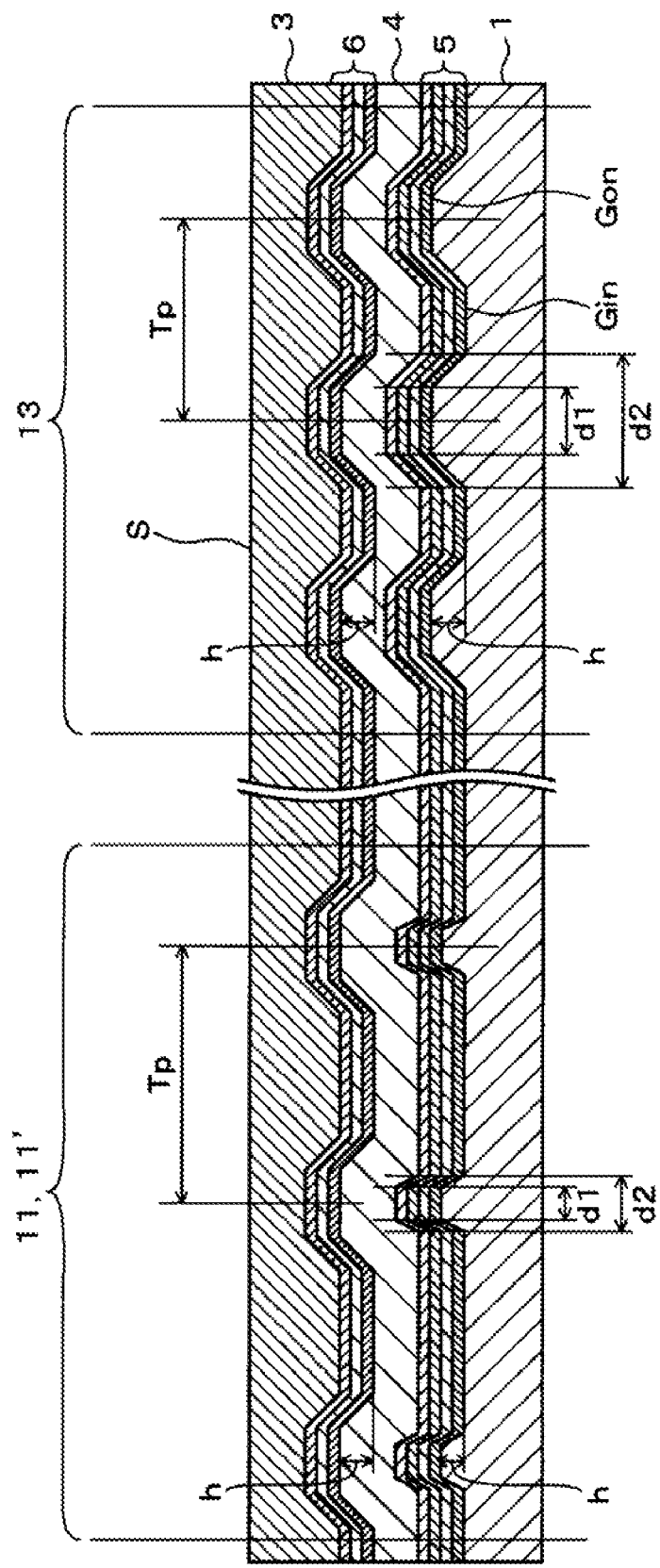
FIG. 10 is a cross sectional view showing an example of each area set to the optical disc according to the second embodiment.

FIG. 10 shows an example of areas set to the optical disc according to the second embodiment. This optical disc has a discoidal shape formed with an opening at a center. As shown in FIG. 10, the BCA 11, the PIC (control data of the disc) area (not shown), and the data recording area 13 are set onto the optical disc from the inner rim side toward the outer rim side.

The recording and reproduction of the information signal are executed to the optical disc by irradiating the laser beam from the cover layer 3 side to the first information recording layer 5 or the second information recording layer 6. For example, the laser beam having the wavelength of 400 nm to 410 nm is converged by the objective lens 10 having the numerical aperture of 0.84 to 0.86 and irradiated from the cover layer 3 side to the first information recording layer 5 or the second information recording layer 6, so that the recording or the reproduction of the information signal is executed. For example, a double-layer BD can be mentioned as such an optical disc.

The first information recording layer 5, the second information recording layer 6, and the intermediate layer 4 constructing the optical disc will be sequentially described hereinbelow.

Each of the first information recording layer 5 and the second information recording layer 6 has, for example, at least an inorganic recording film. The inorganic recording film is, for example, a WORM type inorganic recording film. As such a type of inorganic recording film, for example, a phase change type, an alloy type, or the like can be mentioned.

Figure 11:
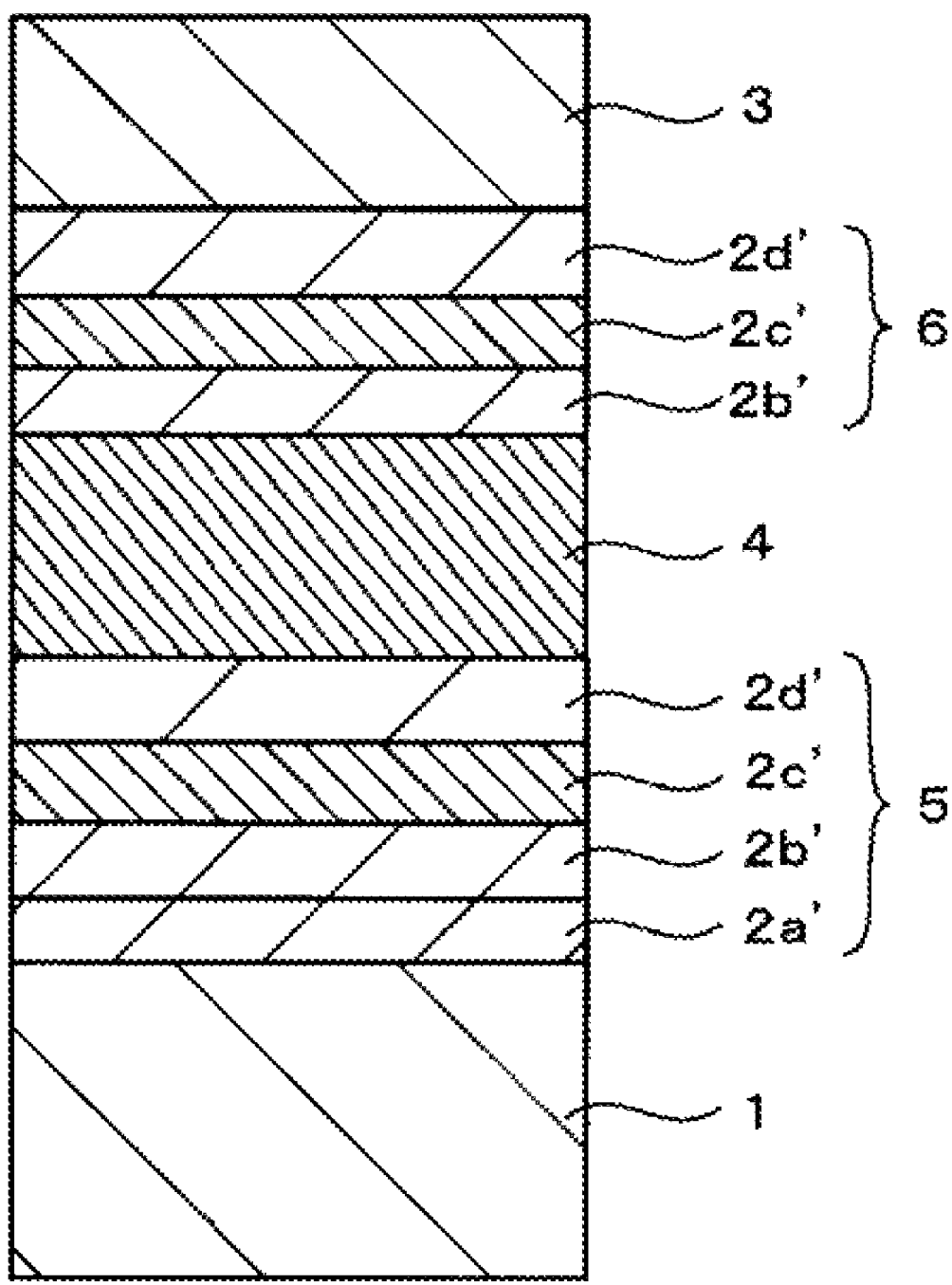
FIG. 11 is a cross sectional view showing an example of information recording layers of the optical disc according to the second embodiment.

FIG. 11 shows an example of the first information recording layer 5 and the second information recording layer 6. The first information recording layer 5 is formed by sequentially laminating the reflecting film 2a', dielectric film 2b', inorganic recording film 2c', and dielectric film 2d' onto the substrate 1. The second information recording layer 6 is formed by sequentially laminating the dielectric film 2b', inorganic recording film 2c', and dielectric film 2d' onto the intermediate layer 4.

The intermediate layer 4 is formed onto the first information recording layer 5 and its thickness is selected to, for example, 25 μm. The intermediate layer 4 is made of a resin material having transparency. As such a resin material, for example, a plastic material such as polycarbonate system resin, polyolefine system resin, acrylic resin, or the like can be used. The surface serving as a cover layer 3 side of the intermediate layer 4 is a concave/convex surface including the in-grooves Gin and the on-grooves Gon in a manner similar to the substrate 1. The second information recording layer 6 is formed as a film onto the concave/convex surface.

The intermediate layer 4 is formed by, for example, a method whereby, under a vacuum environment, a transparent resin stamper is pressed onto an ultraviolet hardening resin which has been coated in flat onto the first information recording layer 5, the concave/convex portions of this stamper are transferred onto the ultraviolet hardening resin, and ultraviolet rays are irradiated onto the ultraviolet hardening resin, thereby hardening the resin. Also in the intermediate layer 4, in a manner similar to the foregoing substrate 1, the concave portion which is far from the laser beam incident plane S in the concave/convex surface is called an in-groove Gin and the convex portion which is close to the laser beam incident plane S in the concave/convex surface is called an on-groove Gon.

As shapes of the concave in-groove Gin and the convex on-groove Gon, for example, various shapes such as spiral shape, concentrical shape, and the like can be mentioned. The in-groove Gin and/or the on-groove Gon has been wobbled in order to add the address information.

The on-groove Gon in an inner rim area 11' has the same shape as the on-groove Gon in, for example, the data recording area 13. That is, the width d and the depth (height) h of the on-groove Gon in the inner rim area 11' are equal to the width d and the depth (height) h of the on-groove Gon in, for example, the data recording area 13. The in-grooves Gin and the on-grooves Gon provided in the inner rim area 11' and the data recording area 13 of the intermediate layer 4 have, for example, the shapes similar to those of the grooves formed in the data recording area 13 of the substrate 1.

A distance between the adjacent on-grooves Gon, that is, a track pitch Tp in the inner rim area 11' differs from that in the data recording area 13. The track pitch Tp in the inner rim area 11' is wider than that in the data recording area 13.

(2-2) Manufacturing Method of Optical Disc

An example of a manufacturing method of the optical disc having the construction as mentioned above will now be described with reference to FIGS. 12A and 12B.

First, steps up to the manufacturing steps of the first information recording layer 5 are executed in a manner similar to the foregoing first embodiment, thereby manufacturing the substrate 1 formed with the first information recording layer 5.

Figure 12A:
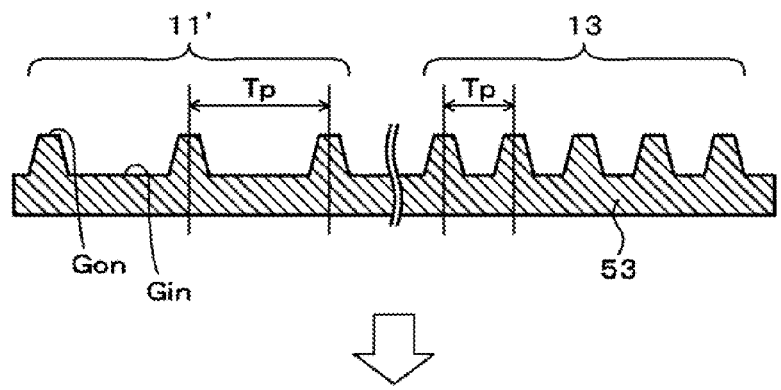
FIGS. 12A and 12B are cross sectional views for describing an example of a manufacturing method of the optical disc according to the second embodiment.

A master stamper 53 as shown in FIG. 12A is formed by, for example, a laser exposure or the like. The master stamper 53 has a ring shape formed with an opening in a center portion and grooves have been formed on one principal plane. Each of the grooves, that is, concave portions formed on the master stamper 53 is called an in-groove Gin and a convex portion formed between the in-grooves Gin is called an on-groove Gon hereinbelow.

The inner rim area 11', the PIC area (not shown), and the data recording area 13 are sequentially provided on one principal plane of the master stamper 53 from the center portion toward the outer peripheral side in a manner similar to the master stamper 51 in the foregoing first embodiment. The inner rim area 11' and the data recording area 13 of the master stamper 53 exist in almost the same radial regions as those of the BCA 11 and the data recording area 13 of the master stamper 51, respectively. The on-groove Gon in the inner rim area 11' has almost the same shape as that of, for example, the on-groove Gon existing in the data recording area 13.

A distance between the adjacent on-grooves Gon, that is, the track pitch Tp in the inner rim area 11' differs from that in the data recording area 13. The track pitch Tp in the inner rim area 11' is wider than that in the data recording area 13.

Figure 12B:
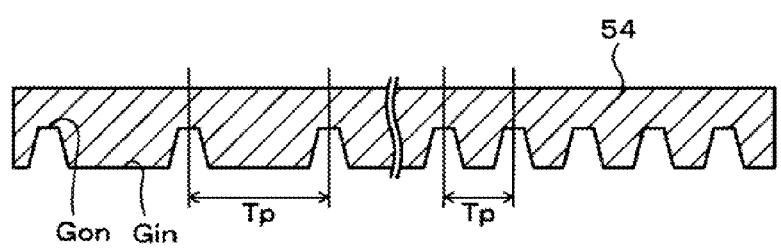

Subsequently, a resin stamper 54 as shown in FIG. 12B is molded from the master stamper 53 by, for example, the injection molding method (injection method), the photopolymer method (2P method: Photo Polymerization), or the like.

Figure 13A:
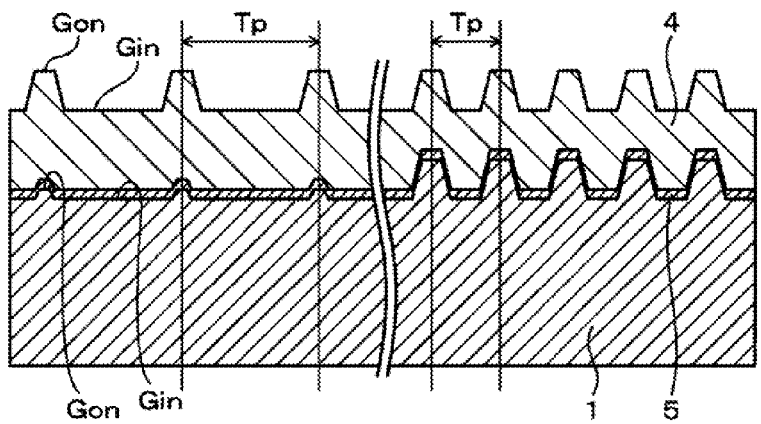
FIGS. 13A to 13C are cross sectional views for describing an example of the manufacturing method of the optical disc according to the second embodiment.

Subsequently, the surface of the substrate 1 is uniformly coated with the ultraviolet hardening resin by, for example, the spin coating method. After that, the in-grooves Gin and the on-grooves Gon of the resin stamper 54 are transferred onto the ultraviolet hardening resin which has uniformly been coated onto the substrate 1 and the ultraviolet hardening resin is hardened. Thus, the intermediate layer 4 provided with the in-grooves Gin and the on-grooves Gon is formed as shown in FIG. 13A.

Figure 13B:
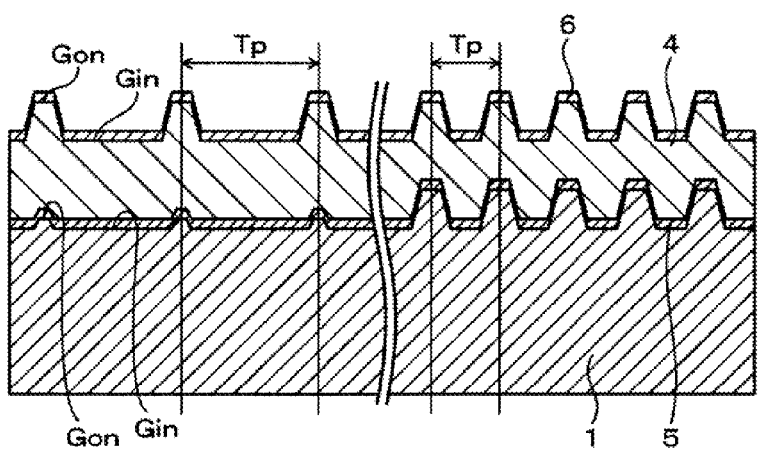

Subsequently, the dielectric film $2b'$, inorganic recording film $2c'$, and dielectric film $2d'$ are sequentially laminated onto the intermediate layer 4 by, for example, the sputtering method. Thus, the second information recording layer 6 is formed onto the substrate 1 as shown in FIG. 13B.

Figure 13C:
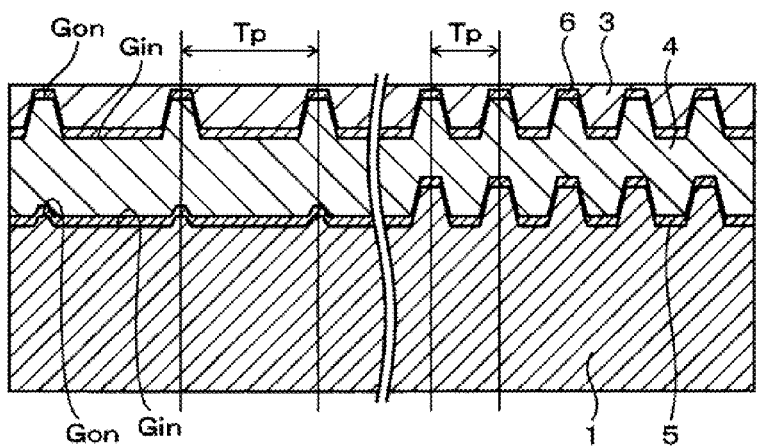

Subsequently, the cover layer 3 is formed onto the second information recording layer 6 as shown in FIG. 13C in a manner similar to the foregoing first embodiment. Subsequently, for example, the bar-code-like recording mark is formed in the BCA 11 of the first information recording layer 5.

The target optical disc is obtained in this manner.

EXAMPLES

Although the embodiments will be specifically explained hereinbelow by Examples, the embodiments are not limited only to those Examples. In the following Examples, the portions corresponding to those in the foregoing embodiments are designated by the same reference numerals.

Figure 14:
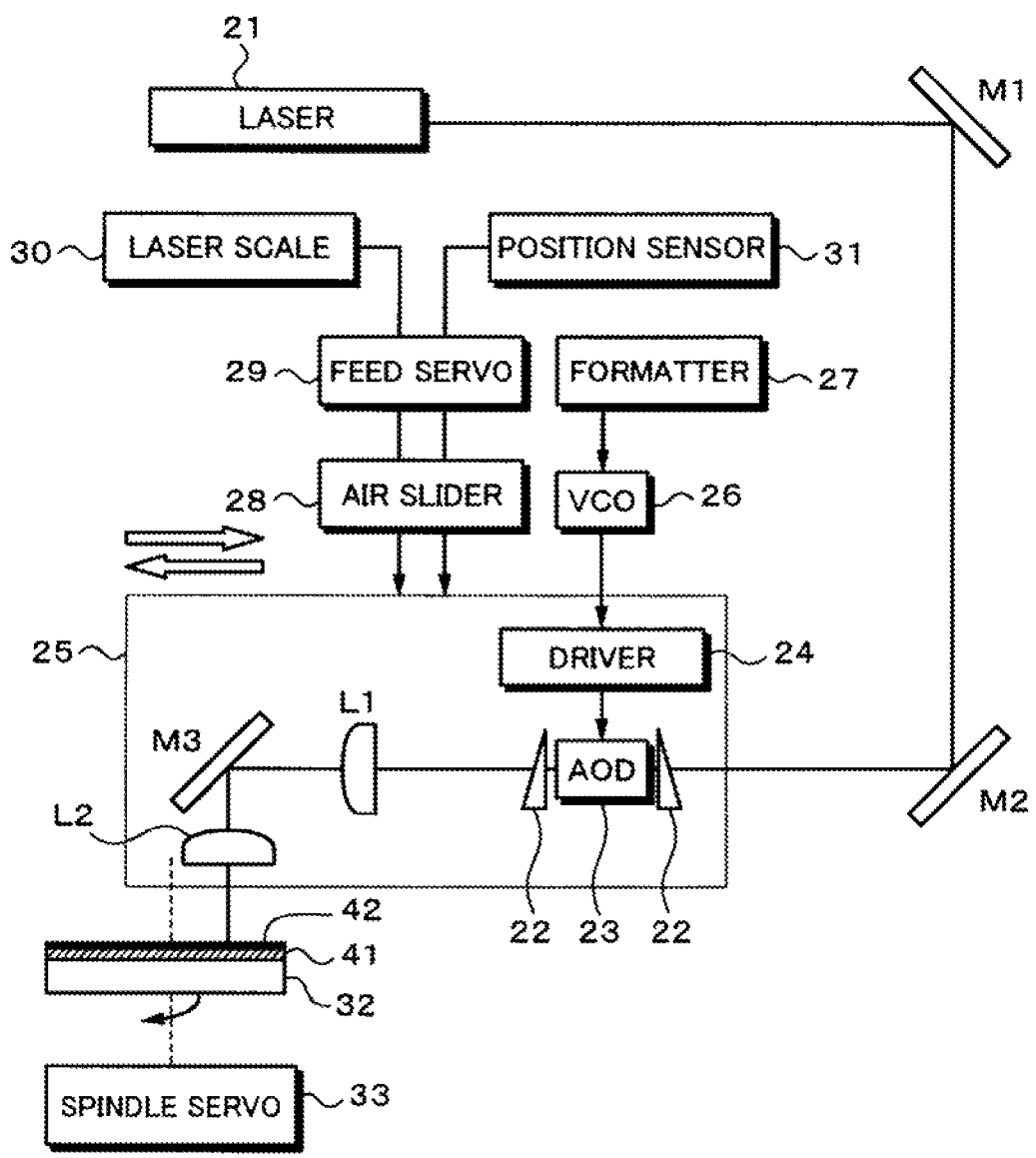
FIG. 14 is a schematic diagram showing a construction of an optical recording apparatus which is used to manufacture a glass mother disc.

First, an optical recording apparatus (also referred to as a cutting apparatus) which is used to manufacture the glass mother disc will be described with reference to FIG. 14.

The optical recording apparatus has a laser light source 21, a motion optical table 25, a turntable 32; and a spindle servo 33 as main units.

The laser light source 21 is a light source for exposing the resist layer 42 formed as a film on the surface of the glass mother disc 41 serving as a recording medium. The laser light source 21 is used to oscillate, for example, the laser beam for recording having a wavelength λ (=266 nm). However, the light source for exposing is not particularly limited only to such a laser light source. The laser beam emitted from the laser light source 21 progresses rectilinearly as a parallel beam and is reflected by mirrors M1 and M2, so that its direction is changed and the laser beam is guided to the motion optical table 25.

An AOM/AOD (Acoustic Optical Modulator/Acoustic Optical Deflector) 23 and two wedge prisms 22 are arranged on the motion optical table 25. The AOM/AOD 23 and the wedge prisms 22 are arranged in such a manner that the laser beam which has entered as a parallel beam and a lattice plane formed by the AOM/AOD 23 satisfy a Bragg's condition and a beam horizontal height is not changed. As an acoustic optical element which is used for the AOM/AOD 23, a tellurium oxide ($TeO_2$) is suitable.

A predetermined signal is supplied from a driver 24 for driving to the AOM/AOD 23. This signal is a DC signal of a predetermined level in the case where the rectilinear on-groove Gon is formed in the BCA 11. A high frequency signal is supplied from a VCO (Voltage Controlled Oscillator) 26 to the driver 24 for driving. A control signal is supplied from a formatter 27 to the VCO 26.

The AOM/AOD 23 is made on such a principle that a primary diffracted light intensity in a Bragg's diffraction is almost proportional to an ultrasonic power. The AOM/AOD 23 modulates the ultrasonic power on the basis of the recording signal, thereby modulating the laser beam. To realize the Bragg's diffraction, a positional relation and a posture of the AOM/AOD 23 to an optical axis of the laser beam are set so as to satisfy the Bragg's condition ($2d \sin \theta = n\lambda$), where, d: grid interval λ: wavelength of the laser beam θ: angle between the laser beam and the lattice plane n: integer As a control signal from the VCO 26, the direct current (DC) signal is used in the BCA 11, the rectangular signal of the biphase modulation is used in the PIC area 12, and the multiplex signal of the MSK (Minimum Shift Keying) of 956 [kHz] and the STW (Saw Tooth Wobble) of the double wave is used in the data recording area 13.

The laser beam which has been modulated and deflected as mentioned above is irradiated to the resist layer 42 of the glass mother disc 41 by a mirror M3 and an objective lens L2 and latent images of the on-grooves Gon in the BCA 11, the PIC area 12, and the data recording area 13 are formed, respectively.

(Manufacturing Steps of Mother Disc for Optical Disc)

First, the cutting is performed under the following conditions by using the optical recording apparatus having the construction as mentioned above.

Upon cutting, a rotational speed of the turntable 32 is controlled so that a linear velocity in the longitudinal direction of the track is equal to 5.28 [n/sec], a feed pitch of the motion optical table 25 is changed every area, and the exposure is performed.

A position of the motion optical table 25 is detected by a position sensor 31, the exposure is performed at the timing and pitch corresponding to each area, and the latent images of the groove patterns in BCA 11, the PIC area 12, and the data recording area 13 are formed in the resist layer 42 on the glass mother disc 41, respectively.

The operations of a feed servo 29 and an air slider 29 are controlled by using a wavelength (for example, 0.78 μm) detected by a laser scale 30 as a reference and a feed pitch of the motion optical table 25 is gradually changed.

In bands 1 to 7 corresponding to the BCA 11, the exposure is performed from the band 1 toward the band 7 by decreasing a cutting power from 160% to 100% by 10% at a time. The cutting power is set to 200% in a band 8 corresponding to the PIC area 12, and bands 9 and 10 corresponding to the data recording area 13, respectively.

The feed pitch is set to 2.000 μm (2000 nm) in the BCA 11, 0.350 μm (350 nm) in the PIC area 12, and 0.320 μm (320 nm) in the data recording area 13, respectively. Specifically speaking, the feed pitch is set to 2000 nm in a region of the BCA 11 (radius r=21.0 mm to 22.0 mm). The feed pitch is gradually changed from 2000 nm to 350 nm in a track pitch transition area (radius r=22.0 mm to 22.4 mm) between the BCA 11 and the PIC area 12. The feed pitch is set to 350 nm in a region of the PIC area 12 (radius r=22.4 mm to 23.197 mm). The feed pitch is gradually changed from 350 nm to 320 nm in a track pitch transition area (radius r=23.197 mm to 23.2 mm) between the PIC area 12 and the data recording area 13. The feed pitch is set to 320 nm in a region of the data recording area 13 (radius r=23.2 mm to 58.5 mm).

Subsequently, the glass mother disc 41 is developed by using a developing apparatus (not shown). First, the glass mother disc 41 on which the latent images of the on-grooves Gon have been formed as mentioned above is put onto the turntable of the developing apparatus so that the resist layer 42 is located in an upper portion. In this state, the glass mother disc 41 is rotated for the horizontal plane. Thereafter, a developing liquid is dropped onto the resist layer 42 and the resists are developed. Thus, the groove track in the BCA 11, the groove track in the PIC area 12, and the groove track in the data recording area 13 are formed so as to be in one spiral line. Specifically speaking, the on-grooves Gon of the track pitch of 2000 nm are formed in the BCA 11, the rectangular wobble grooves (on-grooves Gon) of the track pitch of 350 nm are formed in the PIC area 12, and the wobble grooves (on-grooves Gon) of the track pitch of 320 nm are formed in the data recording area 13, respectively.

(Manufacturing Steps of Stamper)

Subsequently, a conductive film made by a nickel coating film is formed onto the concave/convex pattern of the glass mother disc 41 by the electroless plating method. Thereafter, the glass mother disc 41 formed with the conductive film is attached to the electroforming apparatus and a nickel plated layer is formed onto the conductive film by the electric plating method so as to have a thickness of about 300 μm.

Subsequently, the nickel plated layer is peeled off from the glass mother disc 41 formed with the nickel plated layer by a cutter or the like. The resist on the signal forming surface of the peeled nickel plated layer is cleaned by using acetone or the like. Thus, the master stamper 51 is obtained. Subsequently, the mother stamper 52 having the reversed concave/convex surface is formed from the master stamper 51.

(Manufacturing steps of Optical Disc)

Subsequently, the concave/convex shapes of the mother stamper 52 are transferred to a transparent resin by the injection molding method. Thus, the substrate 1 having a thickness of 1.1 mm is obtained. As a transparent resin, polycarbonate (refractive index: 1.59) is used.

Subsequently, the concave/convex shapes of the substrate 1 obtained as mentioned above are observed by an AFM (Atomic Force Microscope) and the depth h and width d of the on-groove Gon are obtained. Its results are shown in Table 1. The depth h of the on-groove Gon is equal to a distance from the surface of the substrate 1 to a bottom portion of the on-groove Gon. The width d of the on-groove Gon is equal to the average value (d1max+d2min)/2 of the maximum width d1max on the surface side and the minimum width d2min on the bottom portion side.

Subsequently, the Ti film 2a having a thickness of 20 nm, the GeO film 2b having a thickness of 24 nm, and the ZnS—SiO$_2$ film 2c having a thickness of 60 nm are sequentially formed onto the substrate 1 by using a film forming apparatus (made by Unaxis Co., Ltd.; trademark: Sprinter).

Subsequently, by adhering the light transmitting sheet by the PSA, the cover layer 3 is formed. Thicknesses of the light transmitting sheet and the PSA are set so that the thickness of cover layer 3 is equal to 100 μm. Subsequently, the BCA mark which conforms with the BD standard is recorded into the BCA 11 of the obtained optical disc.

The optical disc which conforms with the BD standard is obtained in this manner.

(Evaluation of Characteristics of IH/IL)

Subsequently, with respect to the optical disc obtained as mentioned above, the characteristics of IH/IL of a reproduction signal of the BCA mark are evaluated. Results are shown in Table 1. The reproduction signal of the BCA Mark is evaluated by using an optical disc evaluating apparatus having an optical pickup in which a wavelength is equal to 406 nm and an NA is equal to 0.85. This evaluating apparatus has a magnescale having resolution of 5 μm and can accurately measure a radial position of the address.

TABLE 1

| BAND | RADIAL POSITION START [mm] | RADIAL POSITION END [mm] | TRACK PITCH [μm] | GROOVE DEPTH [nm] | GROOVE WIDTH [nm] | CUTTING POWER [%] | GROOVE SHAPE | ILmax/IHmin ≦0.5 | FORMAT |
|---|---|---|---|---|---|---|---|---|---|
| 1 | 20.915 | 21.153 | 2 | 24 | 170 | 160 | U-SHAPE | 0.51 | BCA |
| 2 | 21.153 | 21.302 | 2 | 16.7 | 126 | 150 | V-SHAPE | 0.498 | BCA |

TABLE 1-continued

| BAND | RADIAL POSITION START [mm] | RADIAL POSITION END [mm] | TRACK PITCH [μm] | GROOVE DEPTH [nm] | GROOVE WIDTH [nm] | CUTTING POWER [%] | GROOVE SHAPE | ILmax/IHmin ≦0.5 | FORMAT |
|---|---|---|---|---|---|---|---|---|---|
| 3 | 21.302 | 21.451 | 2 | 12.4 | 115 | 140 | V-SHAPE | 0.493 | BCA |
| 4 | 21.451 | 21.6 | 2 | 7.5 | 103 | 130 | V-SHAPE | 0.485 | BCA |
| 5 | 21.6 | 21.75 | 2 | 4.2 | 95 | 120 | V-SHAPE | 0.476 | BCA |
| 6 | 21.75 | 21.899 | 2 | 1.7 | 77 | 110 | V-SHAPE | 0.47 | BCA |
| 7 | 21.899 | 22.05 | 2 | 0.9 | 55 | 100 | V-SHAPE | 0.46 | BCA |
| 8 | 22.05 | 23.25 | 0.35 | 24 | 174 | 200 | U-SHAPE | | PIC |
| 9 | 23.25 | 58.017 | 0.32 | 24 | 178 | 200 | U-SHAPE | | MSK&STW |
| 10 | 58.017 | 58.5 | 0.32 | 24 | 176 | 200 | U-SHAPE | | MSK |

Table 1 shows the depth h and width d of each of the on-grooves Gon and the contrast (ILmax/IHmin) obtained in the case where the BCA 11 has been divided into the bands 1 to 7 and the cutting power has been reduced by 10% at a time toward the bands 1 to 7. The cutting power in Table 1 is expressed by a percentage in the case where a limit laser power by which the groove can be formed (laser power of the band 7) is used as a reference.

The following points will be understood from Table 1 with respect to the (a) cutting power, (b) depth of groove, and (c) width of groove.

(a) Cutting Power

At the cutting power of 100 to 150% (the bands 2 to 7), the resist layer 42 is not removed until the surface of the glass mother disc 41 appears, and a cross sectional shape of the on-groove Gon becomes a V-character shape.

At the cutting power of 160% (the band 1), the resist layer 42 is removed up to the upper surface of the glass mother disc 41 and the cross sectional shape of the on-groove Gon becomes a U-character shape. Such a shape of the on-groove Gon is almost similar to that of the on-groove Gon in the data recording area 13.

In the bands 2 to 7 manufactured at the cutting power of 100% to 150%, ILmax/IHmin≦0.498 and the standard of ILmax/IHmin≦0.5 is satisfied. That is, the BCA mark in the BCA 11 can be preferably reproduced. In the bands 5 to 7 manufactured at the cutting power of 100 to 120%, ILmax/IHmin≦0.476. That is, the BCA mark in the BCA 11 can be preferably reproduced. On the other hand, in the band 1 manufactured at the cutting power of 160%, ILmax/IHmin=0.51 and the standard of ILmax/IHmin≦0.5 is not satisfied.

Therefore, it is preferable to set the cutting power in the BCA 11 to be smaller than that in the data recording area 13 from a viewpoint of preferably reproducing the bar code signal. Specifically speaking, it is preferable that the cutting power in the BCA 11 lies within a range of 100% to 150%, much preferably, 100% to 120%. It is preferable to set the cross sectional shape of the on-groove Gon into the V-character shape from a viewpoint of preferably reproducing the bar code signal.

(b) Depth of Groove

If the depth of on-groove Gon in each of the bands 2 to 7 is set to 0.9 to 16.7 nm, ILmax/IHmin≦0.498 and the standard of ILmax/IHmin≦0.5 is satisfied. If the depth of on-groove Gon in each of the bands 5 to 7 is set to 0.9 to 4.2 nm, ILmax/IHmin≦0.476. That is, tire BCA mark in the BCA 11 can be preferably reproduced. On the other hand, if the depth of on-groove Gon in the band 1 is set to 24 nm, ILmax/IHmin≦0.51 and the standard of ILmax/IHmin≦0.5 is not satisfied.

Therefore, it is preferable to set the depth h of on-groove Gon in the BCA 11 to be shallower than that in the data recording area 13 from a viewpoint of preferably reproducing the bar code signal. Specifically speaking, it is preferable that the depth h of on-groove Gon lies within a range of 0.9 nm to 16.7 nm, much preferably, 0.9 nm to 4.2 nm.

If the depth h of on-groove Gon in each of the bands 2 to 7 is expressed by the phase depth $\lambda/\alpha n$, it lies within the following range.

$$\lambda/296.8n \sim \lambda/16.0n$$

(where, n: refractive index of the cover layer=1.52)

$$\lambda/296.8n$$

(where, $\alpha$=406 [nm]/(1.52×0.9 [nm])=296.8)

$$\lambda/16.0n$$

(where, $\alpha$=406 [nm]/(1.52×16.7 [nm])=16.0)

If the depth h of on-groove Gon in each of the bands 5 to 7 is expressed by the phase depth $\lambda/\alpha n$, it lies within the following range.

$$\lambda/296.8n \sim \lambda/63.6n$$

(where, n: refractive index of the cover layer=1.52)

$$\lambda/296.8n$$

(where, $\alpha$=406 [nm]/(1.52×0.9 [nm])=296.8)

$$\lambda/63.6n$$

(where, $\alpha$=406 [nm]/(1.52×4.2 [nm])=63.6)

(c) Width of Groove

If the width of on-groove Gon in each of the bands 2 to 7 is set to 55 to 126 nm, ILmax/IHmin≦0.498 and the standard of ILmax/IHmin≦0.5 is satisfied. If the width of on-groove Gon in each of the bands 5 to 7 is set to 55 to 95 nm, ILmax/IHmin≦0.476. That is, the BCA mark in the BCA 11 can be preferably reproduced. On the other hand, if the width of on-groove Gon in the band 1 is set to 170 nm, ILmax/IHmin≦0.51 and the standard of ILmax/IHmin≦0.5 is satisfied.

Therefore, it is preferable to set the width d of on-groove Gon in the BCA 11 to be narrower than that in the data recording area 13 from a viewpoint of preferably reproducing the bar code signal. Specifically speaking, it is preferable that the width of on-groove Gon lies within a range of 55 to 126 nm, much preferably, 55 to 95 nm.

If the width of on-groove Gon is normalized by the track pitch, (the width d of on-groove Gon in each of the bands 2 to 7)/(the track pitch Tp) is as follows.

0.0275-0.063
0.0275 (where, 55 [nm]/2000 [nm]=0.0275)
0.063 (where, 126 [nm]/2000 [nm]=0.063)
(The width d of on-groove Gon in each of the bands 5 to 7)/(the track pitch Tp) is as follows.
0.0275–0.0475
0.0275 (where, 55 [nm]/2000 [nm]=0.0275)
0.0475 (where, 95 [nm]/2000 [nm]=0.0475)

As mentioned above, in order to preferably reproduce the bar code signal recorded in the BCA 11, it is preferable to set the depth h and width d of the on-groove Gon in the BCA 11 to be shallower and narrower than those in the data recording area 13, respectively.

Even in the case where the depth h of on-groove Gon in the BCA 11 is set to be shallower than that in the data recording area 13 and the width d of on-groove Gon in the BCA 11 is almost equalized to that in the data recording area 13, such an effect that the bar code signal recorded in the BCA 11 can be preferably reproduced can be obtained.

Even in the case where the width d of on-groove Gon in the BCA 11 is set to be narrower than that in the data recording area 13 and the depth h of on-groove Gon in the BCA 11 is almost equalized to that in the data recording area 13, an effect similar to that mentioned above can be obtained.

Although the embodiments and Examples have specifically been described above, the present disclosure is not limited to the foregoing embodiments and Examples but various modifications based on the technical ideas are possible.

For example, the numerical values mentioned in the foregoing embodiments and Examples are nothing but examples and other numerical values different from them may be used as necessary.

The constructions of the foregoing embodiments and Examples can be also mutually combined without departing from the spirit of the present disclosure.

Although applying the present disclosure to the WORM type optical disc has been described as an example in the foregoing embodiments and Examples, the present disclosure is not limited to such an example. The present disclosure can be also applied to the read only type optical disc and the rewritable type optical disc.

Although the example in which the format is spirally recorded and formed from the inner rim toward the outer rim has been described in the foregoing embodiments, if the feed precision in the case where the format is recorded and formed from the outer rim toward the inner rim on the contrary is high, the format may be recorded and formed from the outer rim toward the inner rim. The present disclosure is not limited to a single layer but can be also applied to a multilayer format of two or more layers.

The present disclosure can be also applied to various optical discs other than the BD. The present disclosure can be applied not only to the optical discs in the related art but also to an optical disc of the next generation whose density is further higher than that of the optical disc such as a BD or the like.

Although the case where the first area (BCA) is provided on the innermost rim side has been described in the foregoing embodiments, the position where the first area is provided is not limited to the innermost rim side but can be also provided in an arbitrary area on the optical disc such as area of the outermost rim side, area between the innermost rim and the outermost rim, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording medium comprising:
    a substrate having a first area in which a first groove has been formed and a second area in which a second groove has been formed;
    at least one information layer provided on said substrate; and
    a protecting layer provided on said information layer,
    wherein predetermined binary information has previously been recorded on said first groove,
    wherein said first groove is shallower or narrower than said second groove, and
    wherein said information layer is composed of
        an inorganic recording film including a first recording film, and a second recording film formed on the first recording film, and
        a dielectric film formed on the second recording film.

2. The recording medium according to claim 1, wherein said binary information is recorded to each medium by a laser beam.

3. The recording medium according to claim 1, wherein said binary information is recorded to each medium by a laser beam on the basis of the same principle as a principle for recording the information onto said second groove.

4. The recording medium according to claim 1, wherein the first recording film contains Ti and
    the second recording film contains an oxide of Ge.

5. The recording medium according to claim 1, wherein the inorganic recording film includes SbZnSSiO.

6. The recording medium according to claim 1, wherein in a cutting step of manufacturing a stamper for molding said substrate, a power of an exposing beam corresponding to the first groove is set to be smaller than a power of an exposing beam corresponding to the second groove, thereby manufacturing the stamper.

7. The recording medium according to claim 1, wherein a depth of said first groove is equal to 0.9 to 16.7 nm.

8. The recording medium according to claim 1, wherein a phase depth of said first groove is equal to $\lambda/296.8n$ to $\lambda/16.0n$ where:
    $\lambda$: wavelength of a laser beam for recording or reproducing, and
    n: refractive index of a transparent cover layer to the laser beam for recording or reproducing.

9. The recording medium according to claim 1, wherein a width of said first groove is equal to 55 to 126 nm.

10. The recording medium according to claim 1, wherein (a groove width)/(a track pitch) of said first groove is equal to 0.0275 to 0.063.

11. The recording medium according to claim 1, wherein said binary information is recorded as a bar-code-like mark.

12. The recording medium according to claim 1, wherein said first area is an innermost rim area and said second area is a data recording area.

13. A method of manufacturing a recording medium, the method comprising:
    forming a substrate by transferring a shape of a transfer surface of a stamper to a resin material;
    forming an information layer onto said substrate; and
    forming a protecting layer onto said information layer,
    wherein said stamper includes
        a first stamper groove which forms a first groove into a first area of said substrate, and a second stamper groove which forms a second groove into a second area of said substrate, wherein said first stamper groove is shallower or narrower than said second stamper groove, and wherein said information layer is composed of an inorganic recording film including a first recording film, and a second recording film formed on the first recording film, and a dielectric film formed on the second recording film.

* * * * *